United States Patent
Chakravorty et al.

(10) Patent No.: US 12,554,795 B2
(45) Date of Patent: Feb. 17, 2026

(54) REDUCING CLASS IMBALANCE IN MACHINE-LEARNING TRAINING DATASET

(71) Applicant: Hitachi Energy Ltd, Zürich (CH)

(72) Inventors: Jhelum Chakravorty, Montreal (CA); Nandinee Haq, Nepean (CA); Pawel Dawidowski, Malopolskie (PL)

(73) Assignee: HITACHI ENERGY LTD, Zurich (CH)

( * ) Notice: Subject to any disclaimer, the term of this patent is extended or adjusted under 35 U.S.C. 154(b) by 983 days.

(21) Appl. No.: 17/706,298

(22) Filed: Mar. 28, 2022

(65) Prior Publication Data
US 2023/0306079 A1    Sep. 28, 2023

(51) Int. Cl.
*G06F 18/214* (2023.01)
*G06F 18/2431* (2023.01)
*G06N 20/00* (2019.01)

(52) U.S. Cl.
CPC ...... *G06F 18/2148* (2023.01); *G06F 18/2431* (2023.01); *G06N 20/00* (2019.01)

(58) Field of Classification Search
CPC .................................................. G06F 18/2148
USPC ........................................................ 706/12
See application file for complete search history.

(56) References Cited

U.S. PATENT DOCUMENTS

| | | | |
|---|---|---|---|
| 2010/0016740 A1* | 1/2010 | Sigg | A61N 1/365 607/9 |
| 2021/0326680 A1 | 10/2021 | Chaaraoui et al. | |
| 2022/0414526 A1* | 12/2022 | Darrah | G06N 3/098 |

FOREIGN PATENT DOCUMENTS

| | | |
|---|---|---|
| CN | 105930856 A | 9/2016 |
| CN | 109993229 A | 7/2019 |
| CN | 111652268 A | 9/2020 |
| JP | 2013-161298 A | 8/2013 |
| WO | 2020178936 A1 | 9/2020 |
| WO | 2022029844 A1 | 2/2022 |

OTHER PUBLICATIONS

Li et al., "Shapelets-based Data Augmentation for Time Series Classification", 2021 20th IEEE International Conference on Machine Learning and Applications (ICMLA), p. 1373-1378, 978-1-6654-4337-1/21, DOI 10.1109/ICMLA52953.2021.00222.

(Continued)

*Primary Examiner* — Austin Hicks
(74) *Attorney, Agent, or Firm* — PROCOPIO, CORY, HARGREAVES & SAVITCH LLP

(57) ABSTRACT

Class imbalance in a training dataset may negatively impact the accuracy of a machine-learning model in classifying rare events that are underrepresented in the training dataset. Training datasets comprising time-series data present a unique challenge. Accordingly, resampling techniques for up-sampling and/or down-sampling a training dataset of time series are disclosed. The up-sampling may respect the temporal correlation of time samples in the time series, while generating synthetic time series that mimic the feature values of time series belonging to the minority class. Down-sampling may be used to fine-tune the ratio of time series belonging to the minority class to the time series belonging to the majority class.

19 Claims, 6 Drawing Sheets

(56) References Cited

OTHER PUBLICATIONS

Cao et al., Integrated Oversampling for Imbalanced Time Series Classification, IEEE Transactions on Knowledge and Data Engineering, Dec. 2013, https://www.researchgate.net/publication/237053351, DOI: 10.1109/TKDE.2013.37, 15 pages.

Chawla et al., SMOTE: Synthetic Minority Over-sampling Technique, Journal of Artificial Intelligence Research 16 (2002), pp. 321-357, Jun. 2002, AI Access Foundation and Morgan Kaufmann Publishers, 38 pages.

Moniz et al., Resampling strategies for imbalanced time series forecasting, International Journal of Data Science and Analytics (2017) 3, pp. 161-181, DOI 10.1007/s41060-017-0044-3, Springer International Publishing Switzerland, Feb. 16, 2017, 21 pages.

* cited by examiner

300

REDUCING CLASS IMBALANCE IN MACHINE-LEARNING TRAINING DATASET

BACKGROUND

Field of the Invention

The embodiments described herein are generally directed to machine learning, and, more particularly, to reducing class imbalance in a dataset used to train a machine-learning model.

Description of the Related Art

In many mission-critical applications, rare events must be correctly identified so that an appropriate action can be taken. The protection of a power system is one such application. In particular, when a fault in the power system occurs, protection devices may be employed to disconnect the faulty section of the power system from the rest of the power system, in order to contain the fault. Alternatively, monitoring devices may be employed to identify anomalous behavior in the power system. It should be understood that there are similarly rare events, for which a responsive action must be selected and taken, in other types of mission-critical applications.

Machine learning is one useful tool for responding to events in a system, including in mission-critical applications. Machine-learning models are trained to produce an output (e.g., classification) based on the features of an input. Since machine learning is data-driven, the quality of the dataset that is used to train the model will be a key factor in the accuracy of the resulting model. In supervised learning for a machine-learning classifier, the training dataset comprises sets of feature values (e.g., feature vectors) that are labeled with their corresponding ground-truth classes.

In the event that the possible classes include a relatively rarely occurring class, the distribution of labels in the training dataset will be heavily skewed away from that rare class, towards the other class(es). In other words, the rare class may be severely under-represented in the training dataset, such that the training dataset is imbalanced. This imbalance may adversely affect the performance of any machine-learning model that is trained on the dataset.

SUMMARY

Accordingly, systems, methods, and non-transitory computer-readable media are disclosed for reducing class imbalance in a training dataset for machine learning. An objective of embodiments is to increase the proportion of time series of a minority class in a training dataset by generating synthetic time series of the minority class and/or reducing the number of time series of the majority class, to thereby reduce class imbalance in the training dataset (e.g., within a tolerance). A further objective of some embodiments is to generate synthetic time series of the minority class using neighboring time series for each of a sampling of time series in the training dataset, for example, based on a distance between time samples in a pair of time series. A further objective of some embodiments is to train a machine-learning algorithm, such as a binary classifier, using a training dataset for which the class imbalance has been reduced by the disclosed techniques. Advantageously, the reduction of class imbalance in the training dataset produces greater accuracy in machine-learning classifiers that are trained by the more balanced training dataset.

In an embodiment, a method is disclosed for reducing class imbalance in a training dataset for machine learning, the method comprising using at least one hardware processor to execute a process to: receive at least a subset of a training dataset, the training dataset comprising a plurality of time series, each of the plurality of time series comprising a plurality of labeled time samples, each of the plurality of labeled time samples comprising a value of each of one or more features (e.g., a plurality of features) at a particular time within a time frame of the time series and a label representing one of a plurality of classes into which the time sample has been classified; for each time series in the at least a subset of the training dataset, identify a number of neighboring time series in the at least a subset of the training dataset based on a distance metric, for each of one or more of the neighboring time series, for each of the one or more features and for each of the plurality of labeled time samples in that neighboring time series, generate a synthetic value of the feature in a synthetic time sample, and generate a synthetic time series from the synthetic time samples comprising the synthetic values of the one or more features; and add the generated synthetic time series to the training dataset.

Receiving at least a subset of a training dataset may comprise selecting a random sample, consisting of a predefined number of time series, from the training dataset.

Receiving at least a subset of a training dataset may comprise selecting a sample, consisting of a predefined number of time series, from the training dataset, to contain a higher proportion of minority time series than non-minority time series, relative to the training dataset, wherein a minority time series is defined as a time series in which a majority of the plurality of labeled time samples comprise a label representing the minority class, and a non-minority time series is defined as a time series in which a majority of the plurality of labeled time samples comprise a label representing one of the plurality of classes that is not the minority class.

The plurality of classes may consist of two classes.

The number of neighboring time series may be a predefined number greater than one.

The method may further comprise using the at least one hardware processor to, for each time series in the at least a subset of the training dataset, generate a predefined number of synthetic time series. Generating a predefined number of synthetic time series may comprise randomly selecting one of the identified number of neighboring time series to use to generate a synthetic time series until the predefined number of synthetic time series has been generated.

For each of the one or more features and for each of the plurality of labeled time samples in that neighboring time series, generating a synthetic value of the feature may comprise: when the label of a corresponding labeled time sample in the time series represents a minority one of the plurality of classes, generating the synthetic value of the feature according to a first bias towards the minority class, and, when the label of the corresponding labeled time sample in the time series does not represent the minority class, generate the synthetic value of the feature according to a second bias that is less biased towards the minority class than the first bias. The minority class may be defined as one of the plurality of classes that is less represented by labels in the plurality of time samples in the plurality of time series in the training dataset than at least one other one of the plurality of classes. Generating the synthetic value of the feature according to the first bias may comprise adding a randomly generated value to the value of the feature in the corresponding labeled time sample in the time series. Generating the synthetic value of the feature according to the second bias may comprise: calculating a distance between the value of the feature in the corresponding labeled time sample in the time series and the value of the feature in the labeled time sample in the neighboring time series; randomly generating a scaling factor; calculating a scaled value by multiplying the calculated distance by the randomly generated scaling factor; and adding the scaled value to the value of the feature in the corresponding labeled time sample in the time series.

For each of the one or more features and for each of the plurality of labeled time samples in that neighboring time series, generating a synthetic value of the feature may comprise: when the label of a corresponding labeled time sample in the time series represents a minority one of the plurality of classes, generating the synthetic value of the feature based on the value of the feature in the corresponding labeled time sample in the time series, and, when the label of the corresponding labeled time sample in the time series does not represent the minority class, generate the synthetic value of the feature based on both the value of the feature in the corresponding labeled time sample in the time series and the value of the feature in the labeled time sample in the neighboring time series. The minority class may be defined as one of the plurality of classes that is less represented by labels in the plurality of time samples in the plurality of time series in the training dataset than at least one other one of the plurality of classes. For example, the minority class may be defined as one of the plurality of classes that is least represented by labels in the plurality of time samples in the plurality of time series in the training dataset. Generating the synthetic value of the feature based on the value of the feature in the corresponding labeled time sample in the time series may comprise adding a randomly generated value to the value of the feature in the corresponding labeled time sample in the time series. Generating the synthetic value of the feature based on both the value of the feature in the corresponding labeled time sample in the time series and the value of the feature in the labeled time sample in the neighboring time series may comprise: calculating a distance between the value of the feature in the corresponding labeled time sample in the time series and the value of the feature in the labeled time sample in the neighboring time series; randomly generating a scaling factor; calculating a scaled value by multiplying the calculated distance by the randomly generated scaling factor; and adding the scaled value to the value of the feature in the corresponding labeled time sample in the time series.

When the label of the corresponding labeled time sample in the time series does not represent the minority class and the label of the labeled time sample in the neighboring time series represents the minority class, a range of the scaling value may be constrained to produce a scaled value that is closer to the value of the feature in the labeled time sample in the neighboring time series than to the value of the feature in the corresponding labeled time sample in the time series. When the label of the corresponding labeled time sample in the time series does not represent the minority class and the label of the labeled time sample in the neighboring time series does not represent the minority class, a range of the scaling value may be constrained to produce a scaled value that is closer to the value of the feature in the corresponding labeled time sample in the time series than to the value of the feature in the labeled time sample in the neighboring time series.

Generating the synthetic time series may comprise labeling the synthetic time series with a label value derived based on a label representing one of the plurality of classes into which the time series is classified and a label representing one of the plurality of classes into which the neighboring time series is classified. The label value may be further derived based on a distance between the synthetic time series and the time series and a distance between the synthetic time series and the neighboring time series. When the plurality of classes consists of two classes, the label value may be derived by binarizing a value that is based on the distance between the synthetic time series and the time series and the distance between the synthetic time series and the neighboring time series.

The method may further comprise using the at least one hardware processor to, after adding the generated synthetic time series to the training dataset, train a machine-learning algorithm using at least a portion of the training dataset.

The one or more features may represent parameters of an electrical system, wherein at least one of the plurality of classes represents an action to be taken in response to an anomaly in the electrical system.

The method may further comprise using the at least one hardware processor to, for each time series in the at least a subset of the training dataset, randomly select the one or more neighboring time series from the identified number of neighboring time series.

The method may further comprise using the at least one hardware processor to, over one or more iterations, remove one or more majority time series, in which a majority of the plurality of labeled time samples comprise a label that does not represent the minority class, from the training dataset, until either a ratio between a number of minority time series, in which a majority of the plurality of labeled time samples comprise a label that represents the minority class, in the training dataset to a number of majority time series, in which a majority of the plurality of labeled time samples comprise a label that represents a majority class, in the training dataset is within a tolerance of a threshold, or a maximum number of iterations is reached.

The distance metric may compare feature vectors of the plurality of time samples in two time series to calculate a non-negative scalar value representing a distance between the two The method may further comprise using the at least one hardware processor to execute the process over one or more iterations until a ratio between a number of minority time series, in which a majority of the plurality of labeled time samples comprise a label that represents the minority class, in the training dataset to a number of majority time series, in which a majority of the plurality of labeled time samples comprise a label that represents a majority class, in the training dataset is within a tolerance of a threshold.

Any of the methods above may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for reducing class imbalance in a training dataset for machine learning. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. SYSTEM OVERVIEW 1.1. Infrastructure

Figure 1:
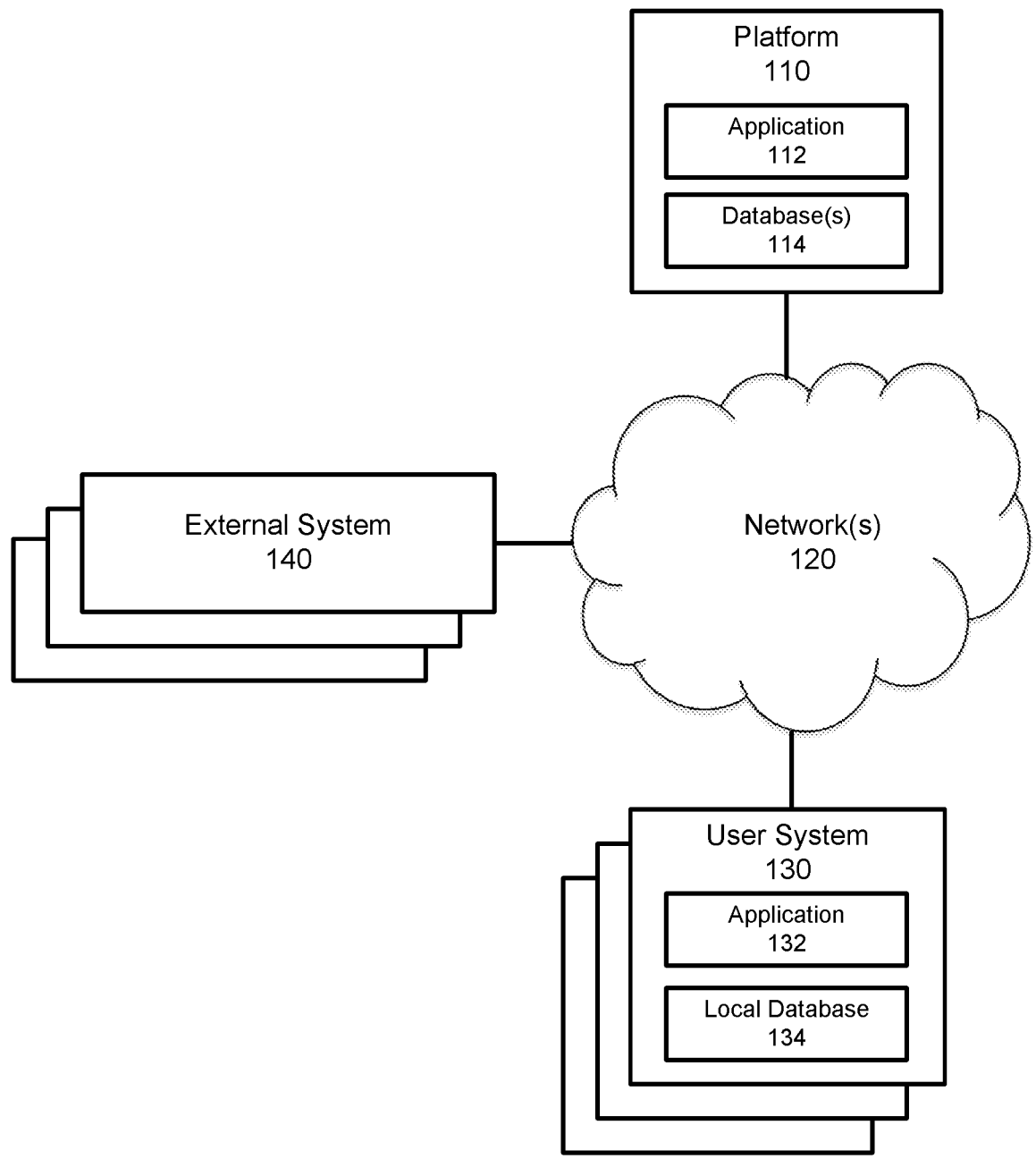
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134. In general, it is contemplated that user system(s) 130 would comprise personal computers or professional workstations that users may utilize to connect to and interact with platform 110 to resample a training dataset, as disclosed herein, which is stored on platform 110 (e.g., in database(s) 114) and/or used to train a machine-learning model hosted on or deployed from platform 110.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation My SQL™, Oracle™, IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
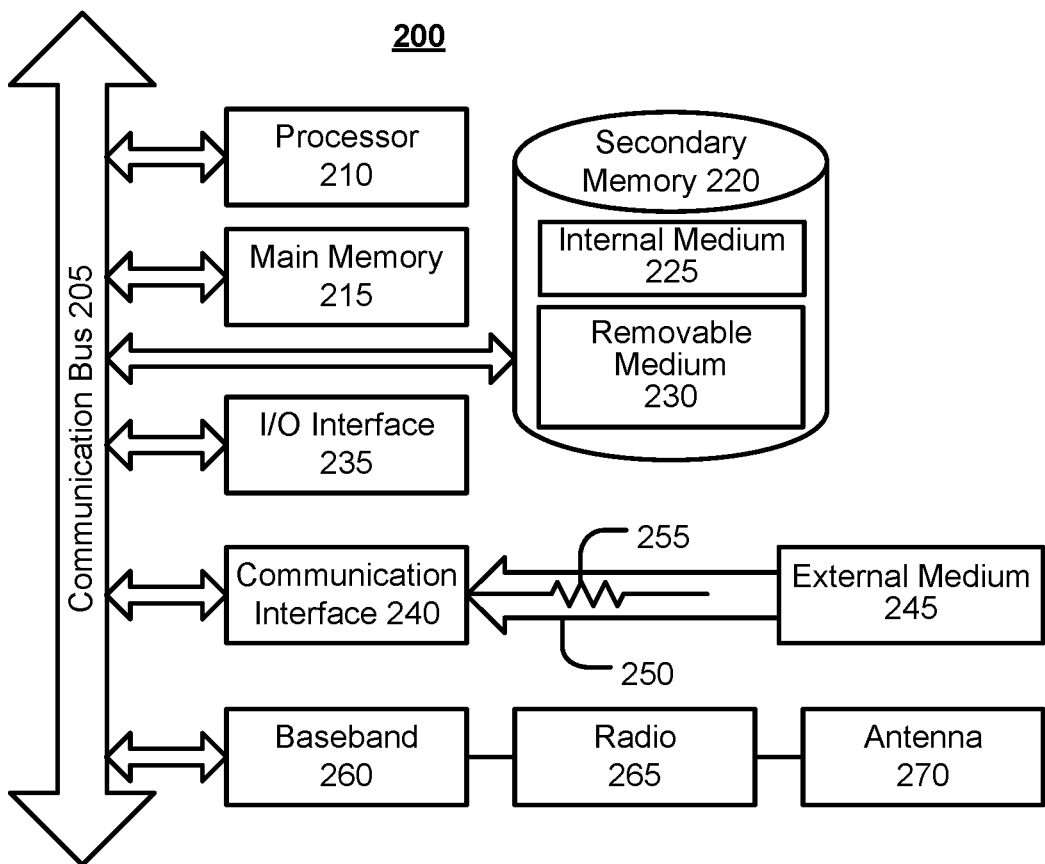
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

2. PROCESS OVERVIEW

Embodiments of processes for reducing class imbalance in a training dataset for machine learning will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction

Before training a machine-learning model, such as a classifier, it is important to balance the training dataset. An unbalanced training dataset will bias the resulting model towards a majority class, since the model will be primarily exposed to data representing the majority class. "Resampling" refers to data pre-processing methods that mitigate imbalance in training datasets by generating synthetic data that mimic the data in the training dataset. The synthetic data for a minority class modifies the overall distribution of class labels in the training dataset towards a more balanced distribution. One example of a resampling method is the Synthetic Minority Over-Sampling Technique (SMOTE), described by Nitesh et al. in "SMOTE: Synthetic Minority Over-Sampling Technique," Journal of Artificial Intelligence Research, 16:321-357, 2002, which is hereby incorporated herein by reference as if set forth in full.

While resampling has proved effective for independent and identically distributed (IID) data, conventional resampling techniques are often not equally effective for time-series data. Time-series data comprise a plurality of time samples. Any resampling of time-series data should account for the dependencies of these time samples along the time dimension. In addition, because time-series data have a time dimension, time-series data are three-dimensional, resulting in a two-fold class imbalance along the batch or case dimension and the time dimension. In other words, the degree of class imbalance for three-dimensional time-series data is more critical than for two-dimensional IID data. For example, the degree of class imbalance in time-series data with fifty time samples in each time series is fifty times greater than the degree of class imbalance in two-dimensional IID data. Thus, the application of traditional interpolation-based resampling, such as SMOTE, to time-series data is prohibitively memory intensive and relatively inefficient.

Thus, embodiments of a process are disclosed herein for resampling time-series data. In particular, the disclosed embodiments reduce imbalance in a training dataset of time-series data in which the time samples of the time series have been labeled with classes for supervised training of a machine-learning classifier. For example, the training dataset may comprise a plurality of time series, each time series may comprise a plurality of time samples, and each time sample may comprise a value for each of one or a plurality of features (e.g., a feature vector of feature values) and a label representing the ground-truth class into which the time sample has been classified. In an embodiment, all of the values of all of the plurality of features may be normalized to a real value between −1 and 1. As will be understood by a person of skill in the art, the original dataset may be labeled in any well-known manner (e.g., manual annotation by one or more levels of experts).

In an embodiment, the resampling process may comprise an up-sampling algorithm that generates synthetic time-series data. In an alternative or additional embodiment, the resampling process may comprise a down-sampling algorithm that reduces the distribution of majority class(es) in the existing time-series data. It should be understood that embodiments may consist of just the up-sampling algorithm or just the down-sampling algorithm, or may comprise both the up-sampling algorithm and the down-sampling algorithm. In each embodiment, the goal may be to attain a ratio of the number of time series, belonging to the minority class, to the number of majority time series, belonging to the majority class, in the training dataset, that satisfies a pre-defined threshold or is within a tolerance range of a pre-defined threshold. It should be understood that, for a binary machine-learning classifier (i.e., having only two possible classes), the ideal value of this ratio is 1.0.

2.2. Up-Sampling Algorithm

The goal of up-sampling is to reduce the severity of class imbalance in a dataset by synthesizing artificial data representing the minority class. In the case of time-series data, each time sample in a synthetic time series, representing a minority class, may be generated from information that is close to a real time series representing the minority class. Table 1 below represents pseudocode for an up-sampling algorithm, according to an embodiment:

rithm 300 may be implemented as a software module, hosted and/or executing on a platform 110 or on a user system 130 that is used to manage training data for a machine-learning model, train the machine-learning model, deploy the machine-learning model, and/or execute the machine-learning model. Up-sampling algorithm 300 may represent the entirety of a resampling process or one module of an overarching resampling process.

Up-sampling algorithm 300 may accept one or more parameter values as input. For example, an input to up-sampling algorithm 300 may be an original dataset (e.g., X in Table 1), representing the original, imbalanced training dataset. Up-sampling algorithm 300 may also accept one or more hyperparameters, such as the number of time series to sample from the original dataset (e.g., n in Table 1), the number of synthetic time series to be generated from each sampled time series in the original dataset (e.g., $n_{ts}$ in Table 1), and the number of neighbors to be used (e.g., k in Table 1, k>0). It should be understood that these hyperparameters may be selected or calculated based on the degree of class imbalance within the dataset. For example, for greater class imbalances, the number of time series to sample, the number of synthetic time series to be generated, and/or the number of neighbors to be used (e.g., n, $n_{ts}$, and/or k, respectively, in Table 1) may be increased. The output of up-sampling algorithm 300 may be a synthetic dataset (e.g., $X_S$ in Table 1) to be incorporated into the original dataset.

Up-sampling algorithm 300 may also receive or initialize one or more parameters. For example, up-sampling algorithm 300 may identify the minority class in the original

TABLE 1

Up-Sampling Algorithm

| | |
|---|---|
| Input | X: original data in dataset |
| | n: number of time series to sample |
| | $n_{ts}$: number of synthetic time series to create |
| | k: number of nearest neighbors to be used |
| Output | $X_s$: synthetic data to be added to dataset |

| | |
|---|---|
| 01: | minority ← class label with minimum number of total time samples in X |
| 02: | $X_s$ ← [ ] |
| 03: | sample n time series S from X (e.g., with higher weight on minority) |
| 04: | for each $TS_i$ in S do |
| 05: |   identify k-nearest neighbors K to $TS_i$ |
| 06: |   for number_synthetic_TS=0 up to $n_{ts}$ |
| 07: |     sample $TS_n$ from K |
| 08: |     if more than half of time samples in $TS_n$ is minority then |
| 09: |       $TS_s$ ← [ ] |
| 10: |       for each feature f in $TS_n$ do |
| 11: |         for each time sample t in $TS_n$ do |
| 12 : |           if $TS_i$ [f] [t] . label == minority then |
| 13: |             $TS_s$ [ f] [t] ← $TS_i$ [f] [t] +rdm (0, 0.1) |
| 14: |           else if $TS_n$ [f] [t] . label == minority then |
| 15: |             $TS_s$ [f] [t] ← $TS_i$ [f] [t] +rdm (0.9, 1) * ($TS_n$ [f] [t] −TS; [f] [t]) |
| 16 : |           else |
| 17: |             $TS_s$ [f] [t] ← $TS_i$ [f] [t] +rdm (0, 0.1) * ($TS_n$ [f] [t] −TS; [f] [t] ) |
| 18: |           end |
| 19: |         end |
| 20: |       end |
| 21: |       TSs.label ← ($TS_i$.label* ($TS_s$-$TS_n$) +$TS_n$. label* ($TS_s$-$TS_i$) ) / ( ($TS_s$-$TS_i$) + ($TS_s$-$TS_n$) ) |
| 22 : |       Add $TS_s$ to $X_s$ |
| 23 : |       number_synthetic_TS ← number_synthetic_TS+1 |
| 24 : |     end |
| 25: |   end |
| 26: | end |
| 27: | return $X_s$ |

Figure 3:
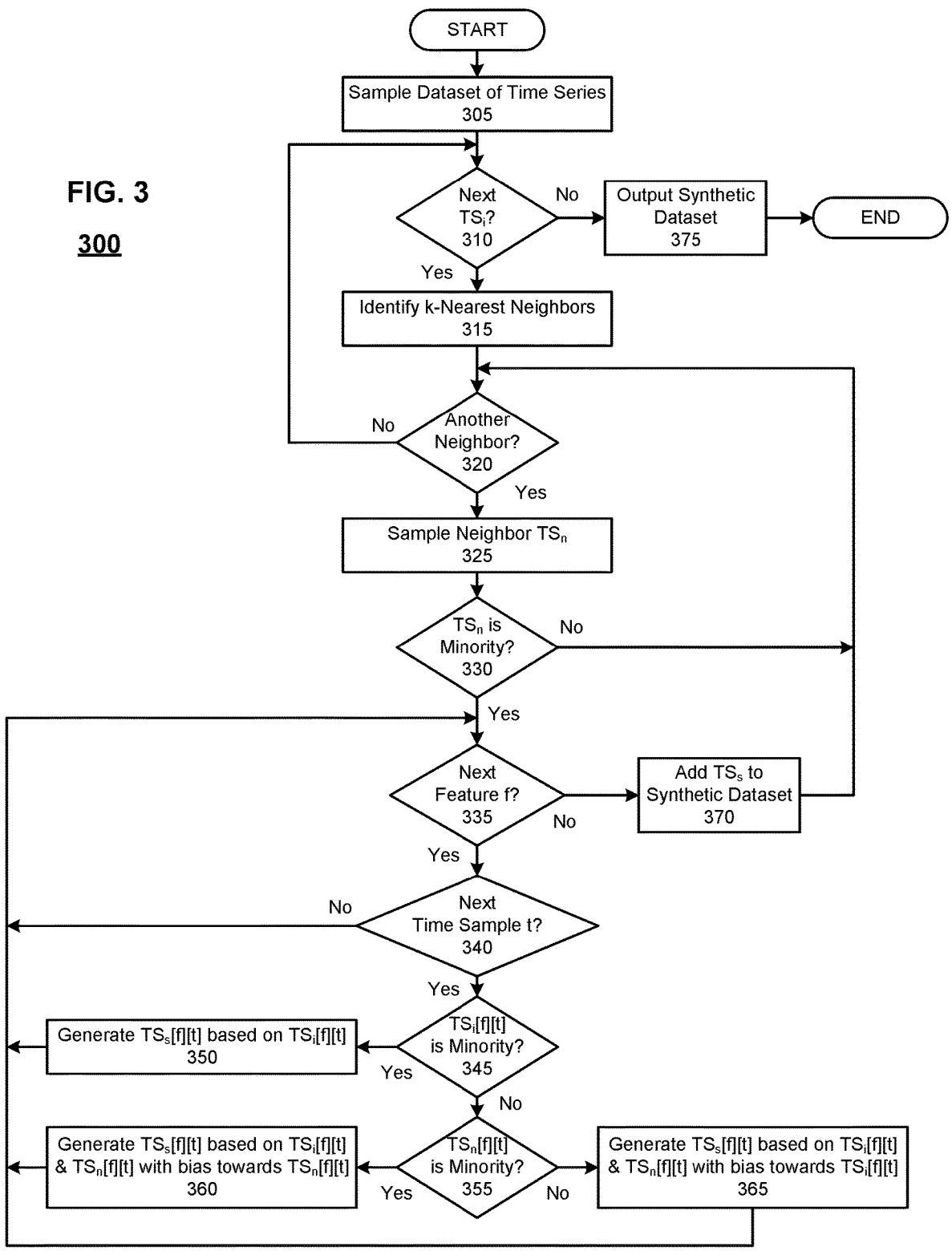
FIG. 3 illustrates a resampling process for reducing class imbalance in a training dataset for machine learning using up-sampling, according to an embodiment.

FIG. 3 illustrates the same up-sampling algorithm in a flowchart, according to an embodiment. Up-sampling algorithm dataset (e.g., line 01 in Table 1). It should be understood that each time sample in each time series in the original dataset may be labeled with one of a plurality of classes. For a binary classifier, there are only two classes, such that one class it the minority class, and the other class is the majority class. The minority class may be determined as the one of the plurality of classes for which there is the least or minimum number of labeled time samples in the original dataset. In addition, up-sampling algorithm 300 may initialize the data structure for the synthetic dataset (e.g., line 02 in Table 1).

In subprocess 305 (e.g., corresponding to line 03 in Table 1), a subset (e.g., S in Table 1) of the original dataset (e.g., X in Table 1) may be sampled. While all of the time series in the original dataset could be sampled, instead of just a smaller subset, this may be too computationally expensive for certain systems. Thus, in an embodiment, only a smaller subset of the original dataset is sampled. In this case, the time series may be randomly sampled from the original dataset. In an embodiment, the sample is weighted to include a higher proportion of time series belonging to the minority class than the original dataset, such that the sample has a skewed probability distribution, in order to increase the probability of randomly selecting a time series of the minority class, relative to the original dataset. In the case of a binary classifier, a time series of the minority class may be defined as a time series that has more time samples of the minority class than time samples of the majority class. The subset may be sampled to consist of a predefined number (e.g., n in Table 1) of time series from the original dataset.

Subprocess 310 (e.g., corresponding to line 04 in Table 1) may iterate through each and every time series in the sampled subset (e.g., S in Table 1) from subprocess 305. If a time series remains to be considered from the sampled subset (i.e., "Yes" in subprocess 310), algorithm 300 proceeds to subprocess 315 to consider the next time series $TS_i$. Otherwise, if no time series remains to be considered from the sampled subset (i.e., "No" in subprocess 310), algorithm 300 proceeds to subprocess 375.

In subprocess 315 (e.g., corresponding to line 05 in Table 1), the k-nearest neighbors (e.g., K in Table 1) in the sampled subset (e.g., S in Table 1) to the current time series $TS_i$ under consideration are identified. In other words, a predefined number (e.g., k in Table 1) of the nearest time series in the sampled subset are identified based on a distance metric. It should be understood that, while it may be preferable in most instances to identify the nearest time series to the current time series $TS_i$ as the set of neighboring time series, this is not a requirement. In an alternative embodiment, the set of neighboring time series that is identified in subprocess 315 may include time series that are farther from the current time series $TS_i$ than a time series that is not included in the set of neighboring time series. For example, the set of neighboring time series may be selected to include neighbors that are within a predefined threshold distance from the current time series $TS_i$, while not necessarily requiring that these neighbors be closer to the current time series $TS_i$ than any neighbor that is not included in the set of neighboring time series. Thus, it should be understood that, whenever the term "k-nearest" is used herein, an alternative embodiment may instead utilize a set of nearby time series (e.g., within a threshold distance), without strictly requiring that it be the set of k-nearest time series. More generally, the neighborhood of a current time series $TS_i$ may be defined in any manner, to include any number of time series according to any criteria and/or metric.

Any metric capable of measuring a correlation or similarity between two time series may be used as the distance metric. For example, the distance metric may measure a Euclidean distance between the feature vectors of the time samples of two time series. As another example, the distance metric may utilize the following correlation distance corr between two vectors $x_1$ and $x_2$ (e.g., feature vectors):

$$\rho(x_1, x_2) := \frac{\sum_i (x_{1i} - \bar{x}_1)(x_{2i} - \bar{x}_2)}{\sqrt{\sum_j (x_{1j} - \bar{x}_1)^2 \sum_k (x_{2k} - \bar{x}_2)^2}}$$

$$\text{corr}(x_1, x_2) := 1 - |\rho(x_1, x_2)|$$

Generally, in an embodiment, the distance metric accepts two time series (e.g., each comprising one or more feature vectors) as an input, and outputs a scalar value representing the distance between the two time series. The distance metric should be symmetrical, such that, as calculated by the distance metric, the distance from a first time series to a second time series is the same as the distance from the second time series to the first time series. In addition, the output value of the distance metric should be non-negative, and the distance between a time series and itself should be zero.

In the event that different time series may have different lengths (e.g., different numbers of time samples), the distance metric may utilize dynamic time warping, as described, for example, in "Dynamic Time Warping," in "Information Retrieval for Music and Motion," Springer, Berlin, Heidelberg, doi.org/10.1007/978-3-540-74048-3_4, which is hereby incorporated herein by reference as if set forth in full, to compare time series of different lengths. It should be understood that, when all time series have the same length, dynamic time warping is not necessary.

Subprocess 320 (e.g., corresponding to line 06 in Table 1) may sample a neighboring time series $TS_n$ from the k-nearest neighbors (e.g., K in Table 1), identified in subprocess 315, until a predefined number (e.g., number_synthetic_TS in Table 1) of synthetic time series $TS_s$ have been generated. If another synthetic time series is to be generated from the current time series $TS_i$ under consideration (i.e., "Yes" in subprocess 320), algorithm 300 proceeds to subprocess 325 to sample the next time series $TS_n$. Otherwise, if no more synthetic time series are to be generated from the current time series $TS_i$ under consideration (i.e., "No" in subprocess 320), algorithm 300 returns to subprocess 310.

In subprocess 325 (e.g., corresponding to line 07 in Table 1), a neighboring time series $TS_n$ is sampled from the k-nearest neighbors (e.g., K in Table 1) identified in subprocess 315. In an embodiment, the neighboring time series $TS_n$ is randomly selected from the set of k-nearest neighbors. However, it should be understood that the neighboring time series $TS_n$ could be selected in any different manner.

In subprocess 330 (e.g., corresponding to line 08 in Table 1), it is determined whether or not the neighboring time series $TS_n$, that was sampled in subprocess 325, belongs to the minority class (e.g., minority in Table 1). In the case of a binary classifier, the neighboring time series $TS_n$ may belong to the minority class if the neighboring time series $TS_n$ has more time samples of the minority class than time samples of the majority class (e.g., more than half of the time samples in the neighboring time series $TS_n$ are labeled with the minority class). If the neighboring time series $TS_n$ belongs to the minority class (i.e., "Yes" in subprocess 330), algorithm 300 proceeds to subprocess 335 to begin creating a synthetic time series $TS_s$ (e.g., initialized in line 09 in Table 1). Otherwise, if the neighboring time series $TS_n$ does not belong to the minority class (i.e., "No" in subprocess 330), algorithm 300 returns to subprocess 320 to potentially sample a new neighboring time series. In this case, the neighboring time series $TS_n$ that was sampled in subprocess 325 is effectively discarded.

Subprocess 335 (e.g., corresponding to line 10 in Table 1) may iterate through each and every feature f in the plurality of features (e.g., in the neighboring time series $TS_n$ that was sampled in subprocess 325). It should be understood that each time series in the original dataset should have the same set of features, such that the current time series $TS_i$ and the current neighboring time series $TS_n$ under consideration should both have values for the same plurality of features. As a result, the synthetic time series $TS_s$ that is generated should also have values for the same plurality of features. If a feature f remains to be considered from the plurality of features (i.e., "Yes" in subprocess 335), algorithm 300 proceeds to subprocess 340. Otherwise, if no feature remains to be considered from the plurality of features (i.e., "No" in subprocess 335), algorithm 300 proceeds to subprocess 370.

Subprocess 340 (e.g., corresponding to line 11 in Table 1) may iterate through each time sample t in the neighboring time series $TS_n$ that was sampled in subprocess 325. Alternatively, subprocess 340 could iterate through each time sample t in the current time series $TS_i$ under consideration. Depending on how the original dataset is constructed, the time series in the original dataset may or may not all have the same number of time samples t. In the event that the pair of time series $TS_i$ and $TS_n$ do not have the same number of time samples t, subprocess 340 may be limited to a number of iterations that is less than or equal to the minimum number of time samples from time series $TS_i$ or $TS_n$ (e.g., to prevent an illegal memory access to the data structure representing the shorter time series). If a time sample t remains to be considered (i.e., "Yes" in subprocess 340), algorithm 300 proceeds to subprocess 345. Otherwise, if no time samples remain to be considered (i.e., "No" in subprocess 340), algorithm 300 returns to subprocess 335 to determine whether another feature remains to be considered.

It should be understood that the order of subprocesses 335 and 340 may easily be switched, such that algorithm 300 iterates over each feature for each time sample, rather than each time sample for each feature. In either case, subprocesses 335 and 340, collectively, iterate over a two-dimensional space of features and time. Overall, the training dataset (e.g., X in Table 1) may be thought of as a three-dimensional structure of time series, time samples, and features. Algorithm 300 processes at least a subset of this three-dimensional structure to generate the synthetic time series.

In subprocess 345 (e.g., corresponding to line 12 in Table 1), it is determined whether or not the current feature f for the current time sample t in the current time series $TS_i$ under consideration (i.e., $TS_i[f][t]$) has been labeled with the minority class. If the current time series $TS_i$ has been labeled with the minority class (i.e., "Yes" in subprocess 345), algorithm 300 proceeds to subprocess 350. Otherwise, if the current time series $TS_i$ has not been labeled with the minority class (i.e., "No" in subprocess 345), algorithm 300 proceeds to subprocess 355. It should be understood that, for binary classification, a time series that is not labeled with the minority class would necessarily be labeled with the majority class.

In subprocess 350 (e.g., corresponding to line 13 in Table 1), the value of a synthetic feature-time-sample $TS_s[f][t]$ may be generated based on the value of the feature-time-sample $TS_i[f][t]$ of the current time series $TS_i$ under consideration. In an embodiment of subprocess 350, the value of the synthetic feature-time-sample $TS_s[f][t]$ is generated based on the value of the feature-time-sample $TS_i[f][t]$ of the current time series $TS_i$, since it is known to belong to the minority class (i.e., by virtue of subprocess 345), and not based on the feature-time-sample $TS_n[f][t]$ of the current neighboring time series $TS_n$ under consideration. For example, as illustrated in Table 1, the value of the synthetic feature-time-sample $TS_s[f][t]$ may be calculated as the value of the feature-time-sample $TS_i[f][t]$ of the current time series $TS_i$, modified based on a random value from a range of possible values. For example, the random value may be added to the value of the feature-time-sample $TS_i[f][t]$ of the current time series $TS_i$.

In Table 1, the selection of the random value in subprocess 350 is represented by the rdm( ) function. The rdm( ) function may return a random number within the range specified by the input arguments, with a uniform distribution over many iterations (i.e., not biased towards any values within the specified range). For example, rdm(0, 0.1) returns a uniform random real value between 0 and 0.1. Notably, in subprocess 350, the range of the random value is set low, so that the resulting value of the synthetic feature-time-sample $TS_s[f][t]$ will be close to the value of the feature-time-sample $TS_i[f][t]$ of the current time series $TS_i$, which belongs to the minority class, as determined in subprocess 345. It should be understood that the range of 0.0 to 0.1 for the random value is merely one example, and that other ranges may be used (e.g., 0.0 to 0.2, 0.1 to 0.3, etc.). In general, the range should be, but does not have to be, a subset of values between 0.0 and 0.5, such that the random value is guaranteed to be closer to 0.0 than to 1.0.

In subprocess 355 (e.g., corresponding to line 14 in Table 1), it is determined whether or not the current feature f for the current time sample t in the current neighboring time series $TS_n$ under consideration (i.e., $TS_n[f][t]$) has been labeled with the minority class. If the current neighboring time series $TS_n$ has been labeled with the minority class (i.e., "Yes" in subprocess 355), algorithm 300 proceeds to subprocess 360. Otherwise, if the current neighboring time series $TS_n$ has not been labeled with the minority class (i.e., "No" in subprocess 355, and corresponding to line 16 in Table 1), algorithm 300 proceeds to subprocess 365.

In subprocess 360 (e.g., corresponding to line 15 in Table 1), the value of a synthetic feature-time-sample $TS_s[f][t]$ may be generated based on both the value of the feature-time-sample $TS_i[f][t]$ of the current time series $TS_i$ under consideration and the value of the feature-time-sample $TS_n[f][t]$ of the current neighboring time series $TS_n$ under consideration. For example, as illustrated in Table 1, the value of the synthetic feature-time-sample $TS_s[f][t]$ may be calculated as the value of the feature-time-sample $TS_i[f][t]$ of the current time series $TS_i$, plus the product of a random value from a range of possible values multiplied by the difference between the value of the feature-time-sample $TS_n[f][t]$ of the current neighboring time series $TS_n$ and the value of the feature-time-sample $TS_i[f][t]$ of the current time series $TS_i$.

In Table 1, the selection of the random value in subprocess 360 is again represented by the rdm( ) function. Notably, in subprocess 360, the range of the random value is set high, so that the resulting value of the synthetic feature-time-sample $TS_s[f][t]$ will be closer to the value of the feature-time-sample $TS_n[f][t]$ of the current neighboring time series $TS_n$, which belongs to the minority class, as determined in subprocess 355, than to the value of the feature-time-sample $TS_i[f][t]$ of the current time series $TS_i$. For example, in Table 1, the range of the random value is set to 0.9 to 1.0, which means that, within the range of possible values between the value of feature-time-sample $TS_i[f][t]$ and the value of feature-time-sample $TS_n[f][t]$, the resulting value of the synthetic feature-time-sample $TS_s[f][t]$ is guaranteed to be within the top 10% of closest values to feature-time-sample $TS_n[f][t]$. As another example, if the range of the random value is set to 0.7 to 0.9, the resulting value of the synthetic feature-time-sample $TS_s[f][t]$ is guaranteed to be outside the top 10% of closest values to feature-time-sample $TS_n[f][t]$, but within the top 30% of closest values to feature-time-sample $TS_n[f][t]$. In other words, the random value acts as a scaling factor to down-scale the distance between the values of the feature-time-sample $TS_i[f][t]$ and the neighboring feature-time-sample $TS_n[f][t]$. It should be understood that the range of 0.9 to 1.0 for the random value is merely one example, and that other ranges may be used (e.g., 0.8 to 1.0, 0.7 to 0.9, etc.). In general, the range should be, but does not have to be, a subset of values between 0.5 and 1.0, such that the random value is guaranteed to be closer to 1.0 than to 0.0.

In subprocess 365 (e.g., corresponding to line 17 in Table 1), the value of a synthetic feature-time-sample $TS_s[f][t]$ may be generated based on both the value of the feature-time-sample $TS_i[f][t]$ of the current time series $TS_i$ under consideration and the value of the feature-time-sample $TS_n[f][t]$ of the current neighboring time series $TS_n$ under consideration. For example, as illustrated in Table 1, the value of the synthetic feature-time-sample $TS_s[f][t]$ may be calculated as the value of the feature-time-sample $TS_i[f][t]$ of the current time series $TS_i$, plus the product of a random value from a range of possible values multiplied by the difference between the value of the feature-time-sample $TS_n[f][t]$ of the current neighboring time series $TS_n$ and the value of the feature-time-sample $TS_i[f][t]$ of the current time series $TS_i$.

In Table 1, the selection of the random value in subprocess 365 is again represented by the rdm( ) function. However, in contrast to subprocess 360, in subprocess 365, the range of the random value is set low, so that the resulting value of the synthetic feature-time-sample $TS_s[f][t]$ will be closer to the value of the feature-time-sample $TS_i[f][t]$ of the current time series $TS_i$ than to the value of the feature-time-sample $TS_n[f][t]$ of the current neighboring time series $TS_n$. For example, in Table 1, the range of the random value is set to 0.0 to 0.1, which means that, within the range of possible values between the value of feature-time-sample $TS_i[f][t]$ and the value of feature-time-sample $TS_n[f][t]$, the resulting value of the synthetic feature-time-sample $TS_s[f][t]$ is guaranteed to be within the top 10% of closest values to feature-time-sample $TS_i[f][t]$. It should be understood that the range of 0.0 to 0.1 for the random value is merely one example, and that other ranges may be used (e.g., 0.0 to 0.2, 0.1 to 0.3, etc.). In general, the range should be, but does not have to be, a subset of values between 0.0 and 0.5, such that the random value is guaranteed to be closer to 0.0 than to 1.0.

It should be understood that the generation of synthetic values described with respect to subprocesses 350, 360, and 365 are only examples, and that the synthetic values may be generated in other manners. For example, in an alternative embodiment, the synthetic values may all be generated by adding a random number to the feature-time-sample $TS_i[f][t]$ of the current time series $TS_i$. In this case, when the feature-time-sample $TS_i[f][t]$ is in the minority class, the random number may be generated to be smaller than when the feature-time-sample $TS_i[f][t]$ is not in the minority class. As another alternative, the synthetic values may be generated according to thresholds. For example, when the feature-time-sample $TS_i[f][t]$ is in the minority class, the synthetic value may be randomly generated so as to be within a first threshold distance from the feature-time-sample $TS_i[f][t]$ and/or at least a second threshold distance away from the feature-time-sample $TS_n[f][t]$ of the current neighboring time series $TS_n$. Conversely, when the feature-time-sample $TS_i[f][t]$ is not in the minority class and the feature-time-sample $TS_n[f][t]$ is in the minority class, the synthetic value may be randomly generated so as to be within a first threshold distance from the feature-time-sample $TS_n[f][t]$ and/or at least a second threshold distance away from the feature-time-sample $TS_i[f][t]$. More generally, when the feature-time-sample $TS_i[f][t]$ is in the minority class, the synthetic value may be generated according to a first bias towards the minority class, and, when the feature-time-sample $TS_i[f][t]$ is not in the minority class, the synthetic value may be generated according to a second bias that is less biased towards the minority class than the first bias (e.g., biased away from the minority class, biased towards the majority class, biased towards the minority class but to a less degree than the first bias, etc.).

In subprocess 370 (e.g., corresponding to line 22 in Table 1), the new synthetic time series $TS_s$ may be added to the synthetic dataset (e.g., $X_s$ in Table 1). Alternatively, the new synthetic time series $TS_s$ may be added directly to the original dataset (e.g., X in Table 1). Subprocess 370 may include adding a label to the synthetic time series $TS_s$ that represents the class to which it belongs (e.g., corresponding to line 21 in Table 1). In an embodiment, the label may be a value representing a similarity or correlation between the synthetic time series $TS_s$, and the time series $TS_i$ and neighboring time series $TS_n$ from which the synthetic time series $TS_s$ was created. For example, in Table 1, for binary classes, the label for the synthetic time series $TS_n$ is calculated as the sum of the product of the label of the current time series $TS_i$ multiplied by the distance between the synthetic time series $TS_s$ and the current neighboring time series $TS_n$ and the product of the label of the current neighboring time series $TS_n$ multiplied by the distance between the synthetic time series $TS_s$ and the current time series $TS_i$, and this sum divided by the sum of the distance between the synthetic time series $TS_s$ and the current time series $TS_i$ and the distance between the synthetic time series $TS_s$ and the current neighboring time series $TS_n$. The distances between time series may be calculated using any distance metric, including the same distance metric that is used to identify the k-nearest neighbors in subprocess 315, discussed above. It should be understood that, in binary classification, the value of a given label for the time series $TS_i$ and $TS_n$ may be either 0 or 1. However, the value of the label for the synthetic time series $TS_s$ may be a real value representing a probability of the class into which the synthetic time series $TS_s$ should be classified. In an alternative embodiment, the value of the label in binary classification may be binarized to either the minority class or the majority class (e.g., by rounding the real value to produce either a 0 or 1). In such an embodiment, the following lines may be added after line 21 in Table 1 to binarize the class label using a binarization threshold (e.g., binarization threshold), which may be user-specified (e.g., included as an input to algorithm 300) or system-specified:

```
if TS_s.label < binarization_threshold
    TS_s.binary_label ← 0
else
    TS_s.binary_label ← 1
end
```

In subprocess 375 (e.g., corresponding to line 27 in Table 1), the synthetic dataset (e.g., $X_s$) is output as the product of algorithm 300. In an alternative embodiment, the synthetic dataset may be incorporated directly into the original dataset.

In summary, up-sampling algorithm 300 may sample time series from the original dataset, and then iterate through pairings of each time series with one of its k-nearest neighbors that belongs to a minority class to create synthetic time series. The utilization of a neighborhood of k-nearest neighbors and a distance metric respects the temporal correlation between time samples, since it ensures that synthesized time samples will not be too far from the original samples. For each feature for each time sample, a synthetic feature value is generated for a synthetic time sample. When possible, each synthetic feature value is calculated to be closer to the feature value of a time sample that belongs to a minority class. In other words, the synthetic feature values mimic the feature values of time samples that belong to the minority class. As a result, the synthetic time series, which are created from these synthetic feature values, mimic time series that belong to the minority class. These synthetic time series can then be incorporated into a training dataset to increase the ratio of the number of time series that belong to the minority class to the total number of time series and/or the number of time series that belong to the majority class. Notably, up-sampling algorithm 300 is able to reuse already available time-series data, such that new time-series data do not need to be acquired, and can achieve the desired ratio while retaining the entire original dataset (e.g., without down-sampling).

2.3. Down-Sampling Algorithm

The goal of down-sampling is to reduce the severity of class imbalance in a dataset by removing data representing the majority class. In the case of time-series data, a subset of time series that belong to the majority class may be removed from the dataset to thereby adjust the ratio of the number of time series that belong to the minority class to the number of time series that belong to the majority class.

Figure 4:
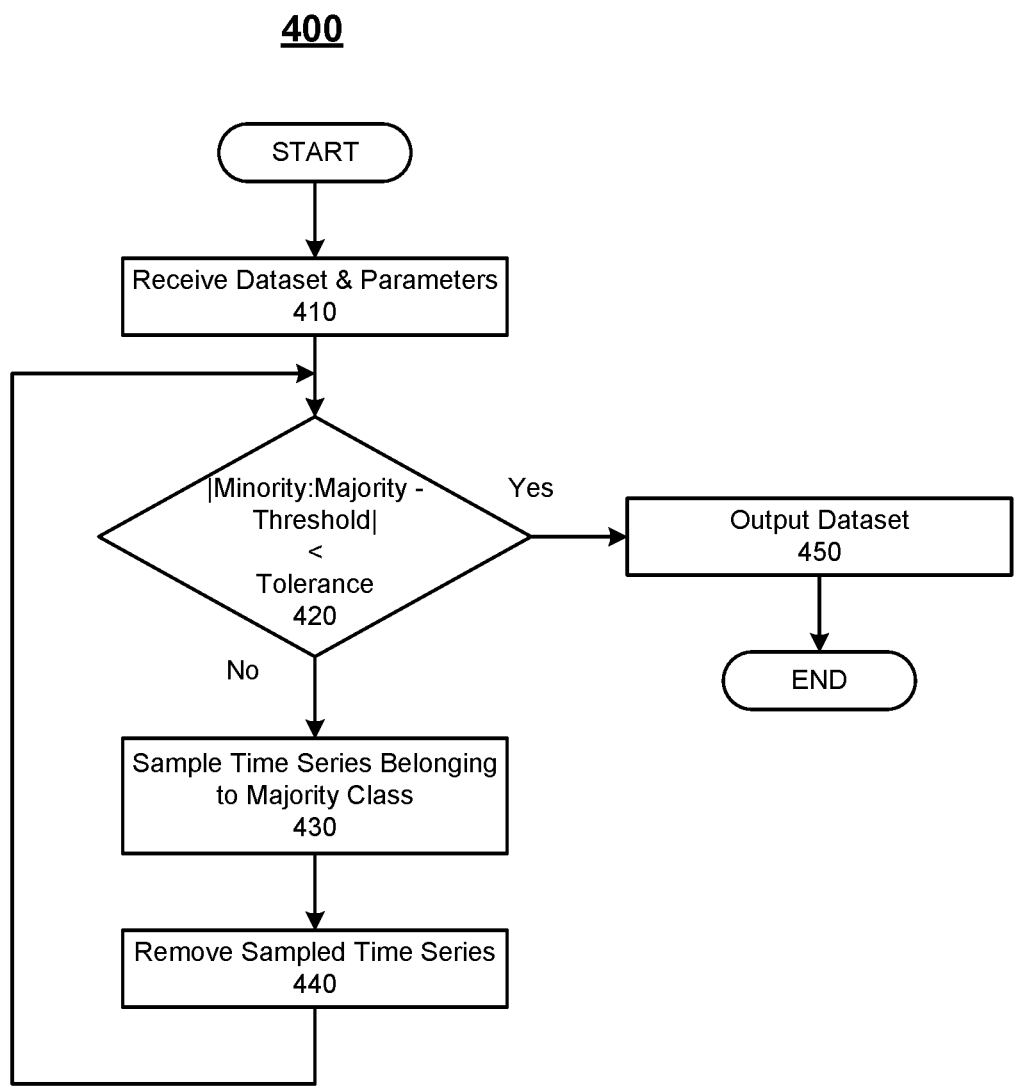
FIG. 4 illustrates a resampling process for reducing class imbalance in a training dataset for machine learning using down-sampling, according to an embodiment.

FIG. 4 illustrates a down-sampling algorithm, according to an embodiment. Down-sampling algorithm 400 may be implemented as a software module, hosted and/or executed on a platform 110 or on a user system 130 that is used to manage training data for a machine-learning model, train the machine-learning model, deploy the machine-learning model, and/or execute the machine-learning model. Down-sampling algorithm 400 may represent the entirety of a resampling algorithm or one module of an overarching resampling algorithm (e.g., in combination with up-sampling algorithm 300).

In subprocess 410, algorithm 400 may receive the dataset to be down-sampled. In addition, algorithm 400 may receive one or more hyperparameters, such as a threshold value and a tolerance value. The threshold value represents the ideal or desired ratio of the number of time series that belong to the minority class to the number of time series that belong to the majority class. In an embodiment, the threshold value is 1.0. The tolerance value represents an acceptable difference between the actual ratio and the desired ratio. In other words, the objective of algorithm 400 is to adjust the dataset, such that the ratio of the number of time series that belong to the minority class to the number of time series that belong to the majority class is greater than the threshold value minus the tolerance value and less than the threshold value plus the tolerance value. As an example, the tolerance value may be 0.01. In general, the tolerance value may be any scalar value that is appropriate for the given task, and will typically be in the range of 0.001 to 0.01.

In subprocess 420, it may be determined whether or not the absolute value of the difference, between the ratio of the number of time series that belong to the minority class to the number of time series that belong to the majority class and the threshold value, is less than the tolerance value. A time series may belong to the minority class when a majority of its time samples are labeled with the minority class. Similarly, a time series may belong to the majority class when a majority of its time samples are labeled with the majority class. If this absolute value is not less than the tolerance value (i.e., "No" in subprocess 420), algorithm 400 proceeds to subprocess 430. Otherwise, if this absolute value is less than the tolerance value (i.e., "Yes" in subprocess 420), algorithm 400 proceeds to subprocess 450.

In subprocess 430, a time series that belongs to the majority class is sampled from the dataset. In an embodiment, the sampled time series is randomly selected from the set of time series, belonging to the majority class, in the dataset. In addition, the dataset may be shuffled before selecting the time series. However, it should be understood that the time series may be selected in any different manner.

In subprocess 440, the sampled time series may be removed from the dataset. Then, algorithm 400 may return to subprocess 420 to reevaluate the ratio of the number of time series that belong to the minority class to the number of time series that belong to the majority class. In an alternative embodiment, subprocess 430 may sample the number of time series that would need to be removed to bring the ratio within the tolerance value from the threshold value, and subprocess 440 may remove all of the sampled time series at once, such that subprocesses 420-440 only need to be performed once.

In subprocess 450, the dataset may be output. It should be understood that the output dataset may be reduced in size by the number of time series that are removed in one or more iterations of subprocess 440. As a result of the removal of these time series, belonging to the majority class, the output dataset may be more balanced than the input dataset. For example, in the case of binary classes, the ratio of the number of time series that belong to the minority class to the number of time series that belong to the majority class in the output dataset will be closer to 1.0 than in the input dataset.

2.4. Example Resampling Process

In an embodiment, a resampling process comprises both up-sampling algorithm 300 and down-sampling algorithm 400. Alternatively, the resampling process may comprise up-sampling algorithm 300, but not down-sampling algorithm 400. As yet another alternative, the resampling process may comprise down-sampling algorithm 400, but not up-sampling algorithm 300.

Figure 5:
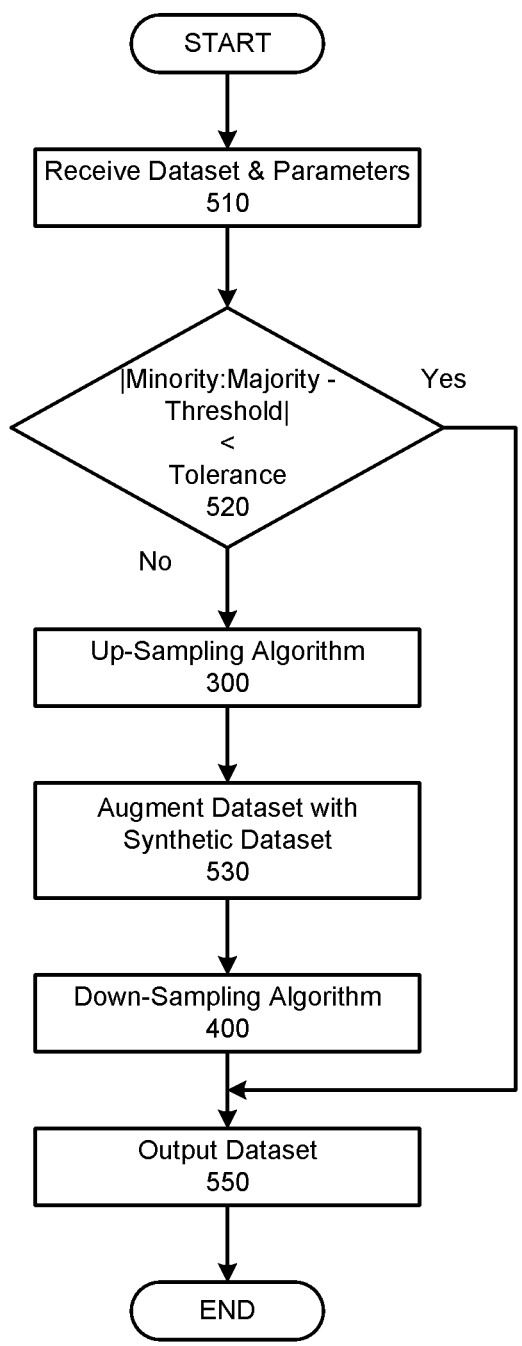
FIG. 5 illustrates a resampling process for reducing class imbalance in a training dataset for machine learning using both up-sampling and down-sampling, according to an embodiment.

FIG. 5 illustrates a resampling process for reducing class imbalance in a training dataset for machine learning using both up-sampling and down-sampling, according to an embodiment. Process 500 may be implemented as a software module, hosted and/or executing on a platform 110 or on a user system 130 that is used to manage training data for a machine-learning model, train the machine-learning model, deploy the machine-learning model, and/or execute the machine-learning model.

In subprocess 510, process 500 may receive the dataset to be resampled. In addition, process 500 may receive one or more hyperparameters, such as any of the hyperparameters described with respect to algorithms 300 and 400. For example, these hyperparameters may include the number of time series to sample from the original dataset, the number of synthetic time series to be generated from each sampled time series in the original dataset, and the number of nearest neighbors to be used, as described with respect to algorithm 300. These hyperparameters may also include the threshold value and tolerance value, as described with respect to algorithm 400.

In subprocess 520, it may be determined whether or not the absolute value of the difference, between the ratio of the number of time series that belong to the minority class to the number of time series that belong to the majority class and the threshold value, in the dataset received in subprocess 510, is less than the tolerance value. Subprocess 520 may be identical or similar to subprocess 420, and therefore, any description of subprocess 420 applies equally to subprocess 520, and vice versa. If this absolute value is not less than the tolerance value (i.e., "No" in subprocess 520), process 500 may execute up-sampling algorithm 300. Otherwise, if this absolute value is less than the tolerance value (i.e., "Yes" in subprocess 520), process 500 may proceed to subprocess 550.

As discussed elsewhere herein, up-sampling algorithm 300 may generate synthetic time series based on the dataset received in subprocess 510. Essentially, up-sampling algorithm 300 generates the synthetic time series by calculating average information from neighboring time series, to thereby reduce temporal bias by randomization and convex combination techniques. Up-sampling algorithm 300 ensures that there are sufficient time series, representing the minority class, to properly balance heavily imbalanced datasets.

In subprocess 530, the synthetic dataset, comprising the synthetic time series generated by up-sampling algorithm 300, may be incorporated into the original dataset to produce an augmented dataset. In an alternative embodiment, up-sampling algorithm 300 could incorporate the synthetic time series into the original dataset as they are generated to directly produce the augmented dataset, such that subprocess 530 may be omitted.

Process 300 may input the augmented dataset into down-sampling algorithm 400 to correct any residual class imbalance. As discussed elsewhere herein, down-sampling algorithm 400 may remove time series that belong to the majority class until the ratio of the number of time series that belong to the minority class to the number of time series that belong to the majority class is within a tolerance range of the threshold value. Down-sampling algorithm 400 provides fine control over this ratio to balance the augmented dataset to a predefined precision represented by the tolerance value.

It should be understood that, in the event that up-sampling algorithm 300 produces a number of synthetic time series that increases the ratio to within the tolerance range of the threshold value, down-sampling algorithm 400 may be finish without removing any time series belonging to the majority class. In other words, in the event that the first iteration of subprocess 420 results in a "Yes" determination, algorithm 400 will perform subprocesses 410, 420, and 450, without performing any iteration of subprocesses 430 and 440.

In subprocess 550, the augmented, and potentially down-sampled, dataset is output. It should be understood that the output dataset will have been rebalanced to within a tolerable level of class imbalance. This output dataset can then be used to train a machine-learning model, such as a binary classifier. As a result of the more balanced training dataset, the resulting machine-learning model may be more accurate in identifying time series belonging to the minority class, which may represent a rare occurrence in a mission-critical application.

3. EXAMPLE USE CASES

It should be understood that the processes described herein, including algorithm 300, algorithm 400, and resampling process 500, may be used to resample the dataset for any machine-learning model that classifies any type of time series in any application or context. However, to provide a concrete, non-limiting example that demonstrates the power of the disclosed processes, one particular application will be described in detail. It should be understood that similar results are achievable in other applications using the disclosed embodiments.

For purposes of demonstration, a training dataset for a machine-learning algorithm for time-domain protection was rebalanced using resampling process 500. Time-domain protection represents a mission-critical application in power systems. In time-domain protection, the task is to train a machine-learning model to classify features of an electrical system for fault detection, phase selection, reach, and/or the like. The training dataset may be imbalanced due to the problem definition. For example, overhead line faults may have very high or very low reach settings. Assuming a uniform distribution of fault locations in the original training dataset, a reach setting of 10% will cause only 10% of all the time series in the original training dataset to be labeled with a fault class. In this case, it should be understood that the fault or trip class (e.g., representing a fault that warrants tripping a circuit breaker) is the minority class. The majority class may be a non-fault or restrain class (e.g., representing no fault or a fault that does not warrant tripping a circuit breaker). Alternatively, for a high reach setting, the fault or trip class may be the majority class, whereas the non-fault or restrain class may be the minority class. Thus, it should be understood that the reach setting will generally determine which class is the majority class and which class is the minority class in the training dataset.

Unlike IID data, time-series data are three-dimensional with correlated time samples along a time dimension. As a result, class imbalance is magnified in time series data, such that conventional resampling techniques, such as bootstrapping, are prohibitively expensive in terms of processing time and memory requirements. In contrast to these conventional resampling techniques, disclosed embodiments of resampling are consistent across correlated time samples, efficient in achieving rebalancing within a given tolerance that may vary depending on the particular application, and preserve the temporal correlation of time samples by considering the entire sequence of features in a time series when imputing a synthetic time series during up-sampling.

In addition, disclosed embodiments facilitate the application of machine learning to contexts with variable settings. For example, in the context of time-domain protection, a machine-learning model may be trained to classify a time series into one of two classes that prescribe either a trip decision (e.g., trip a circuit breaker) or a restrain decision (e.g., do not trip a circuit breaker). This decision is influenced by a set of given reach settings, which renders the class prediction and resulting decision more challenging than in a context with a fixed reach setting.

Precision and recall, as defined below, are two metrics that may be used to capture the strength of a trained machine-learning model:

$$precision = \frac{true\ positives}{true\ positives + false\ positives}$$

$$recall = \frac{true\ positives}{true\ positives + false\ negatives}$$

In the event of class imbalance in the training dataset, there is the potential for giving unequal importance to false positives and false negatives. Thus, a good candidate for capturing the prediction accuracy of a machine-learning classifier is the $F_\beta$ score, which is also known as the $F_1$ score when $\beta=1$. The $F_\beta$ score is a generalization of the harmonic mean of precision and recall and is given by:

$$F_\beta = (1+\beta^2) \frac{precision * recall}{\beta^2 * precision + recall}$$

During experimentation of the disclosed resampling techniques, an attention mechanism was used to capture the relative importance of past information in the current training. The particular attention mechanism that was used is described in Thang et al., "Effective Approaches to Attention-based Neural Machine Translation," arXiv abs/1508.04025 (2015), which is hereby incorporated herein by reference as if set forth in full. Different machine-learning models were trained with non-causal attention (i.e., in which all time samples were used for learning the attention weights), causal attention (i.e., in which future time samples were masked while computing the attention weight at a time instant, and all time samples up to this time instant were used to compute this attention weight), and with no attention mechanism. Multiple machine-learning models were also trained with and without the disclosed resampling techniques and with different hyperparameters.

Experimentation demonstrated that, as measured by the $F_1$ score, the prediction accuracy of a machine-learning model improves when trained on a dataset that has been resampled to reduce class imbalance according to the disclosed resampling techniques. In particular, three machine-learning models were trained for fault detection in time-domain protection: (1) fixed line length of 200 kilometers with a reach setting within 130-190 kilometers; (2) variable line lengths with a reach setting within 120-180 kilometers; and (3) variable line lengths with a reach setting within 50-120 kilometers. For comparison, each machine-learning model was independently trained with both a non-resampled training dataset and a training dataset that was resampled according to the disclosed resampling techniques. The training dataset included time series created from lines of one tower with a fixed line length and time series created from lines of two towers with different line lengths. The $F_1$ scores of the trained machine-learning models are depicted in Table 2 below:

| Machine-Learning Model | $F_1$ score | |
|---|---|---|
| | Non-Resampled Dataset | Resampled Dataset |
| (1) Fixed length | 0.69542 | 0.87028 |
| (2) Variable length (120-180 km reach) | 0.93696 | 0.95084 |
| (3) Variable length (50-120 km reach) | 0.86714 | 0.89509 |

Figure 6:
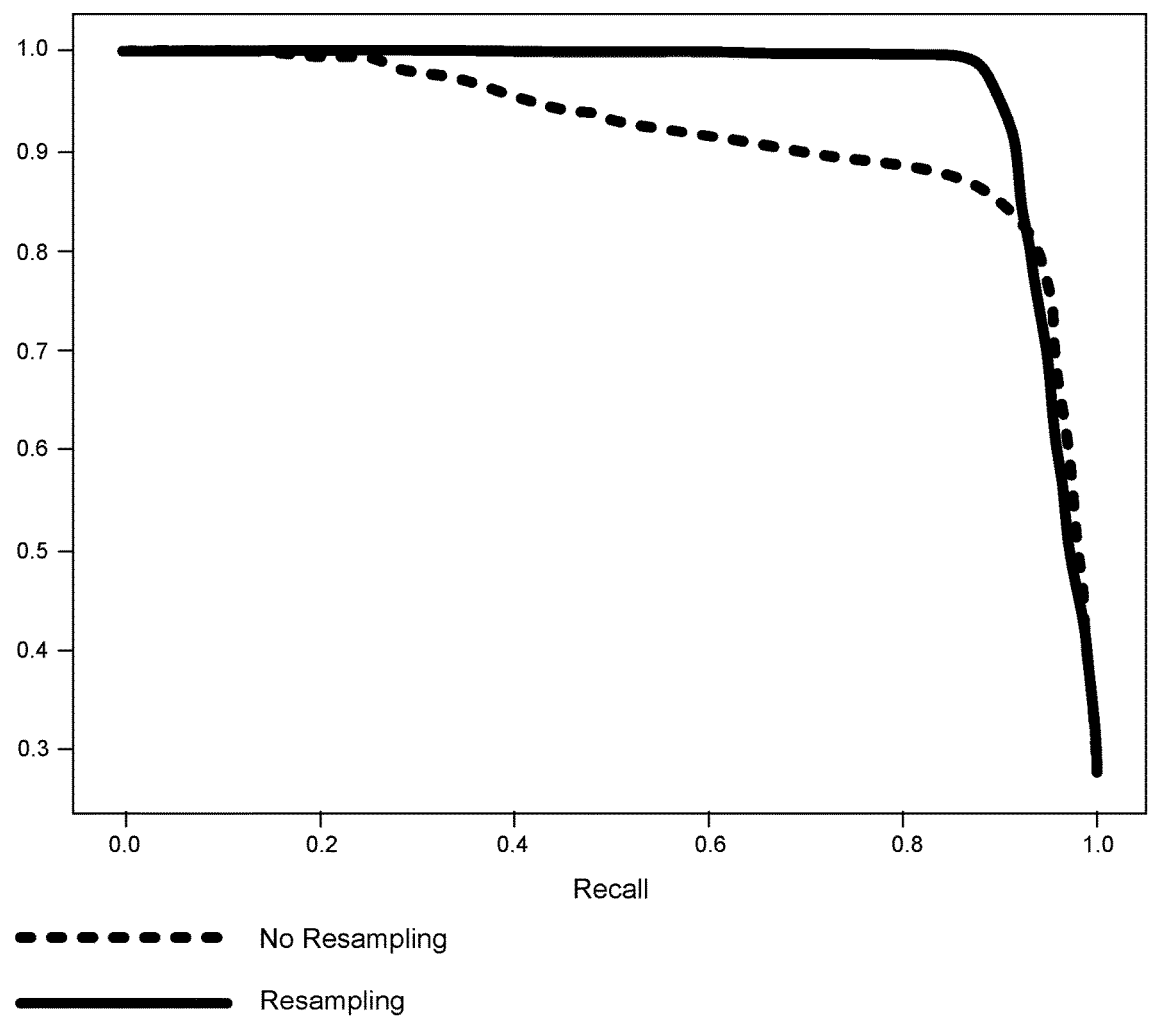
FIG. 6 illustrates a comparison between the precision-recall curves obtained for a machine-learning model that was trained without a resampled dataset and with a dataset that was resampled according to embodiments of the disclosed resampling processes.

FIG. 6 illustrates a comparison between the precision-recall curves obtained for a machine-learning model that was separately trained without a resampled dataset and with a dataset that was resampled according to disclosed resampling techniques. Notably, without the disclosed resampling of the training dataset, the precision of the resulting machine-learning model was significantly less, with relatively more false positives.

As demonstrated by the above results, the disclosed resampling techniques for reducing class imbalance in time-series data can improve machine-learning classification of rare events. In power systems, rare events may occur in the form of faults in transmission lines. Consequently, the disclosed resampling techniques can be used to improve the prediction accuracy of distance protection and time-domain protection.

Apart from protection tasks, class imbalance in time-series data may occur in cascading failures in power transmission networks, in which rare combinations of circumstances, uncommon events, and/or inadequate countermeasures may result in further line disconnections, eventually leading to failure propagation. In such contexts, balancing class labels in the training dataset may yield better estimation and, consequently, prevention of cascading failures, which are rare, but immensely impactful, events. Another context in which the disclosed resampling techniques may be especially useful is load forecasting from time-series data. In load forecasting, rare load events, such as lightning, heatwaves, and/or the like, can create an imbalanced dataset. In such cases, the dataset can be resampled with the disclosed process(es) before training a machine-learning model to perform load forecasting. Other potential contexts include resampling of training datasets for machine-learning models that classify time-series data into classes for outage detection, congestion, the state of a circuit breaker (e.g., open or close), the state of inrush operations for normal or rare events (e.g., external fault, internal fault such as bushing, or explosion), the state of a transformer (e.g., inrush, normal, internal fault, or external fault ride-through), the state of a line fault (e.g., AG, BG, CG, AB, BC, or CA), anomalies or outliers in Supervisory Control and Data Acquisition (SCADA) data, and the like. In general, any time-series dataset may be resampled according to the disclosed resampling techniques, especially in the case of binary classification.

Another example context in which resampling may be especially useful is estimation of the probabilities of contingencies in power transmission networks. The topology of transmission substations can vary as a result of actions by the operator to maintain the facility and mitigate undesirable operation conditions, such as high circuit loading, out-of-limit voltages, forced outages, and/or the like. In some instances, the variations in topology may result in situations in which the protective systems operate, in response to the occurrence of a fault on the network, to remove two or more elements when clearing the fault. Such topologies significantly increase the risk level of the network, since they expose the network to a multi-outage contingency as a result of a single fault, and since the risk associated with a specific contingency is the expected value of the contingency's consequence. Thus, estimating the risk of higher-order contingencies is important for the safety of power systems and requires estimating the probabilities of the contingencies. Accordingly, the disclosed resampling techniques may be applied to time-series data that is used to train a machine-learning model for estimating these probabilities of contingencies.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method for reducing class imbalance in a training dataset for machine learning, the method comprising using at least one hardware processor to execute a process to:
    receive at least a subset of a training dataset, the training dataset comprising a plurality of time series, each of the plurality of time series comprising a plurality of labeled time samples, each of the plurality of labeled time samples comprising a value of each of one or more features at a particular time within a time frame of the time series and a label representing one of a plurality of classes into which the time sample has been classified;
    for each time series in the at least a subset of the training dataset,
        identify a number of neighboring time series in the at least a subset of the training dataset based on a distance metric,
        for each of one or more of the neighboring time series,
            for each of the one or more features and for each of the plurality of labeled time samples in that neighboring time series, generate a synthetic value of the feature in a synthetic time sample, wherein, for each of the one or more features and for each of the plurality of labeled time samples in that neighboring time series, generating a synthetic value of the feature comprises
                when the label of a corresponding labeled time sample in the time series represents a minority one of the plurality of classes, generating the synthetic value of the feature according to a first bias towards the minority class, and,
                when the label of the corresponding labeled time sample in the time series does not represent the minority class, generate the synthetic value of the feature according to a second bias that is less biased towards the minority class than the first bias, and
            generate a synthetic time series from the synthetic time samples comprising the synthetic values of the one or more features; and
        add the generated synthetic time series to the training dataset.

2. The method of claim 1, wherein receiving at least a subset of a training dataset comprises selecting a random sample from the training dataset, wherein the random sample consists of a predefined number of time series.

3. The method of claim 1, wherein receiving at least a subset of a training dataset comprises selecting a sample, consisting of a predefined number of time series, from the training dataset, to contain a higher proportion of minority time series than non-minority time series, relative to the training dataset, wherein a minority time series is defined as a time series in which a majority of the plurality of labeled time samples comprise a label representing the minority class, and a non-minority time series is defined as a time series in which a majority of the plurality of labeled time samples comprise a label representing one of the plurality of classes that is not the minority class.

4. The method of claim 1, wherein the plurality of classes consists of two classes.

5. The method of claim 1, wherein the number of neighboring time series is a predefined number greater than one.

6. The method of claim 1, further comprising using the at least one hardware processor to, for each time series in the at least a subset of the training dataset, generate a predefined number of synthetic time series.

7. The method of claim 6, wherein generating a predefined number of synthetic time series comprises randomly selecting one of the identified number of neighboring time series to use to generate a synthetic time series until the predefined number of synthetic time series has been generated.

8. The method of claim 1, wherein the minority class is defined as one of the plurality of classes that is less represented by labels in the plurality of time samples in the plurality of time series in the training dataset than at least one other one of the plurality of classes.

9. The method of claim 8, wherein generating the synthetic value of the feature according to the first bias comprises adding a randomly generated value to the value of the feature in the corresponding labeled time sample in the time series.

10. The method of claim 8, wherein generating the synthetic value of the feature according to the second bias comprises:
    calculating a distance between the value of the feature in the corresponding labeled time sample in the time series and the value of the feature in the labeled time sample in the neighboring time series;
    randomly generating a scaling factor;
    calculating a scaled value by multiplying the calculated distance by the randomly generated scaling factor; and
    adding the scaled value to the value of the feature in the corresponding labeled time sample in the time series.

11. The method of claim 10, wherein, when the label of the corresponding labeled time sample in the time series does not represent the minority class and the label of the labeled time sample in the neighboring time series represents the minority class, a range of the scaling value is constrained to produce a scaled value that is closer to the value of the feature in the labeled time sample in the neighboring time series than to the value of the feature in the corresponding labeled time sample in the time series.

12. The method of claim 10, wherein, when the label of the corresponding labeled time sample in the time series does not represent the minority class and the label of the labeled time sample in the neighboring time series does not represent the minority class, a range of the scaling value is constrained to produce a scaled value that is closer to the value of the feature in the corresponding labeled time sample in the time series than to the value of the feature in the labeled time sample in the neighboring time series.

13. The method of claim 1, wherein generating the synthetic time series comprises labeling the synthetic time series with a label value derived based on a label representing one of the plurality of classes into which the time series is classified and a label representing one of the plurality of classes into which the neighboring time series is classified.

14. The method of claim 13, wherein the label value is further derived based on a distance between the synthetic time series and the time series and a distance between the synthetic time series and the neighboring time series.

15. The method of claim 14, wherein the plurality of classes consists of two classes, and the label value is derived by binarizing a value that is based on the distance between the synthetic time series and the time series and the distance between the synthetic time series and the neighboring time series.

16. The method of claim 1, further comprising using the at least one hardware processor to, after adding the generated synthetic time series to the training dataset, train a machine-learning algorithm using at least a portion of the training dataset.

17. The method of claim 1, wherein the one or more features represent parameters of an electrical system, and wherein at least one of the plurality of classes represents an action to be taken in response to an anomaly in the electrical system.

18. A system comprising:
at least one hardware processor;
a memory storing software; and
the software configured to, when executed by the at least one hardware processor,
receive at least a subset of a training dataset, the training dataset comprising a plurality of time series, each of the plurality of time series comprising a plurality of labeled time samples, each of the plurality of labeled time samples comprising a value of each of one or more features at a particular time within a time frame of the time series and a label representing one of a plurality of classes into which the time sample has been classified,
for each time series in the at least a subset of the training dataset,
identify a number of neighboring time series in the at least a subset of the training dataset based on a distance metric,
for each of one or more of the neighboring time series,
for each of the one or more features and for each of the plurality of labeled time samples in that neighboring time series, generate a synthetic value of the feature in a synthetic time sample, wherein, for each of the one or more features and for each of the plurality of labeled time samples in that neighboring time series, generating a synthetic value of the feature comprises
when the label of a corresponding labeled time sample in the time series represents a minority one of the plurality of classes, generating the synthetic value of the feature according to a first bias towards the minority class, and,
when the label of the corresponding labeled time sample in the time series does not represent the minority class, generate the synthetic value of the feature according to a second bias that is less biased towards the minority class than the first bias, and
generate a synthetic time series from the synthetic time samples comprising the synthetic values of the one or more features, and
add the generated synthetic time series to the training dataset.

19. A non-transitory computer-readable medium having instructions stored thereon, wherein the instructions, when executed by a processor, cause the processor to:
receive at least a subset of a training dataset, the training dataset comprising a plurality of time series, each of the plurality of time series comprising a plurality of labeled time samples, each of the plurality of labeled time samples comprising a value of each of one or more features at a particular time within a time frame of the time series and a label representing one of a plurality of classes into which the time sample has been classified;
for each time series in the at least a subset of the training dataset,
identify a number of neighboring time series in the at least a subset of the training dataset based on a distance metric,
for each of one or more of the neighboring time series,
for each of the one or more features and for each of the plurality of labeled time samples in that neighboring time series, generate a synthetic value of the feature in a synthetic time sample, wherein, for each of the one or more features and for each of the plurality of labeled time samples in that neighboring time series, generating a synthetic value of the feature comprises
when the label of a corresponding labeled time sample in the time series represents a minority one of the plurality of classes, generating the synthetic value of the feature according to a first bias towards the minority class, and,
when the label of the corresponding labeled time sample in the time series does not represent the minority class, generate the synthetic value of the feature according to a second bias that is less biased towards the minority class than the first bias, and
generate a synthetic time series from the synthetic time samples comprising the synthetic values of the one or more features; and
add the generated synthetic time series to the training dataset.

* * * * *